United States Patent [19]

Kiselewski

[11] Patent Number: 5,013,509
[45] Date of Patent: May 7, 1991

[54] METHOD FOR FORMING A TIRE CLAD CONCRETE LOG

[76] Inventor: Donald L. Kiselewski, 4705 Holly Dr., Palm Beach Gardens, Fla. 33418

[21] Appl. No.: 603,175

[22] Filed: Oct. 25, 1990

Related U.S. Application Data

[62] Division of Ser. No. 379,067, Jul. 13, 1989.

[51] Int. Cl.$^5$ .......................... B28B 1/16; B28B 19/00
[52] U.S. Cl. ..................................... 264/229; 264/112; 264/263; 264/265; 264/267; 264/DIG. 69
[58] Field of Search ................. 264/263, 265, 267–269, 264/228, 229, 333, DIG. 69, 32, 35, 36, 69–72, 112

[56] References Cited

U.S. PATENT DOCUMENTS

| | | |
|---|---|---|
| 3,728,749 | 4/1973 | Eby et al. . |
| 3,848,853 | 11/1974 | Way et al. . |
| 3,934,540 | 1/1976 | Bruner et al. . |
| 3,951,384 | 4/1976 | Hildreth, Jr. . |
| 4,123,489 | 10/1978 | Kelley .................. 264/DIG. 69 X |
| 4,139,319 | 2/1979 | Anderson . |
| 4,186,913 | 2/1980 | Bruner et al. . |
| 4,188,153 | 2/1980 | Taylor . |
| 4,196,694 | 4/1980 | Buchanan . |
| 4,785,577 | 11/1988 | Lederbauer . |
| 4,893,576 | 1/1990 | Day et al. ........................... 264/263 |

FOREIGN PATENT DOCUMENTS 2324214  11/1974  Fed. Rep. of Germany ........ 405/33

Primary Examiner—Jan H. Silbaugh
Assistant Examiner—Karen D. Kutach
Attorney, Agent, or Firm—Wood, Phillips, Mason, Recktenwald & VanSanten

[57] ABSTRACT

A tire clad concrete log and method and apparatus for forming a tire clad concrete log. The method includes the steps of providing a plurality of used tires which are made into a form by placing them in sidewall-to-sidewall contact, providing a quantity of a waste ash which is mixed as a binder in a manner making a concrete material, and filling the form with the concrete material while also maintaining the used tires in sidewall-to-sidewall contact. The tire clad concrete log thus comprises a plurality of used tires disposed in sidewall-to-sidewall contact wherein a concrete material formed at least in part by waste ash is interlockingly disposed within the used tires. The apparatus includes a base plate having upstanding guide members integral therewith to receive and support a plurality of used tires in vertical sidewall-to-sidewall contact together with a cover plate adapted to engage an uppermost one of the used tires in a manner slightly compressing them between the base plate and the cover plate to make a form from the used tires. Additionally, the apparatus is such that the used tires may be filled with the concrete material formed of a waste ash as a binder through the cover plate.

7 Claims, 1 Drawing Sheet

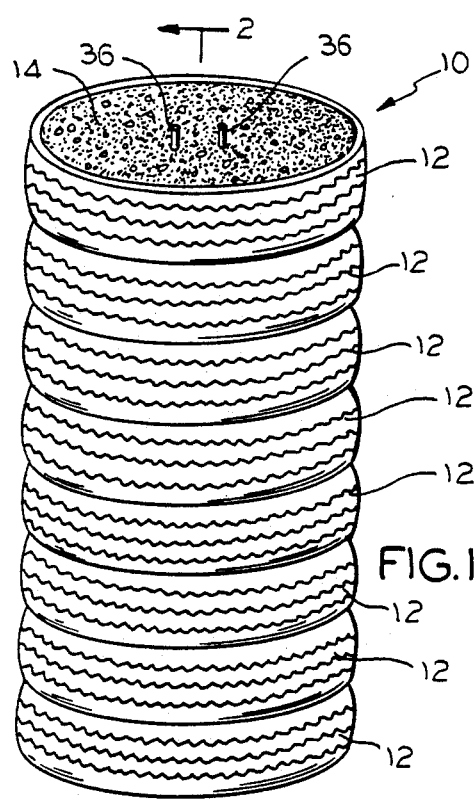
FIG.1
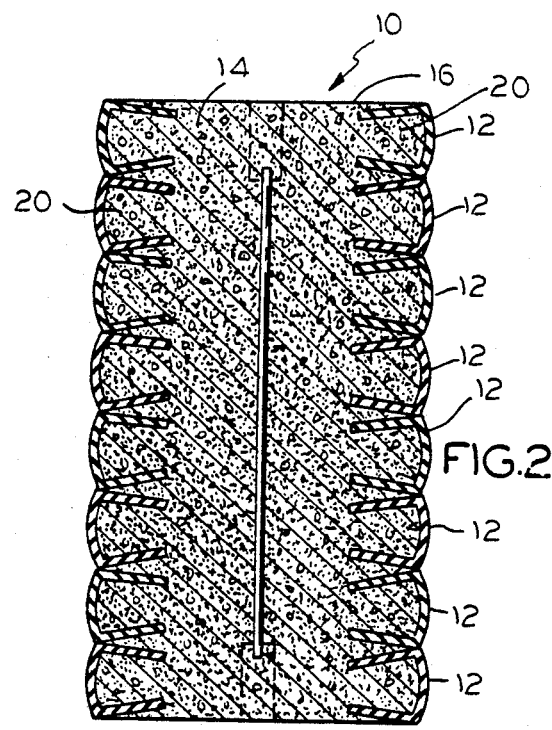
FIG.2
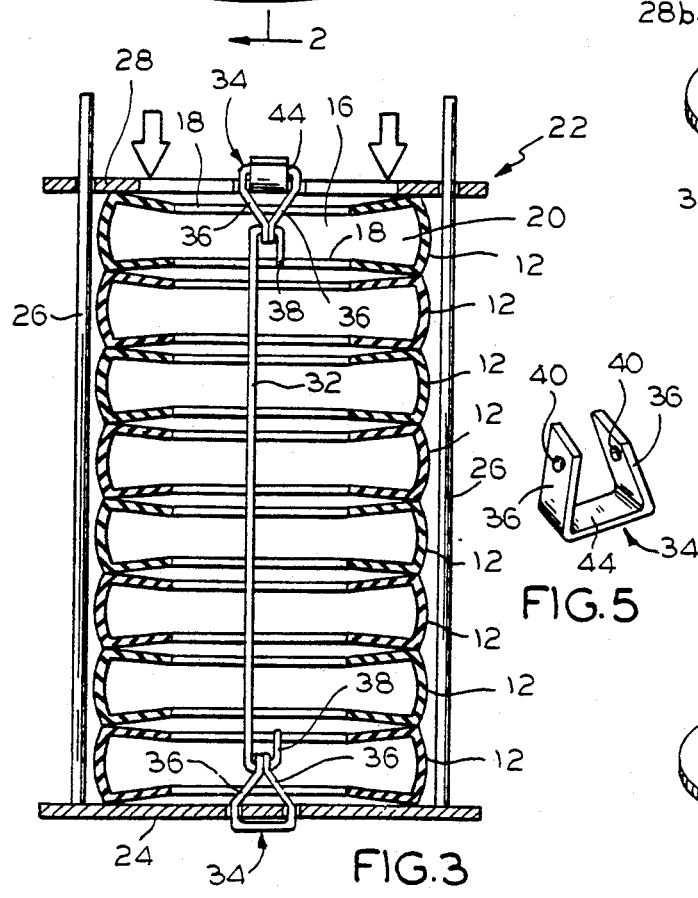
FIG.3
FIG.5
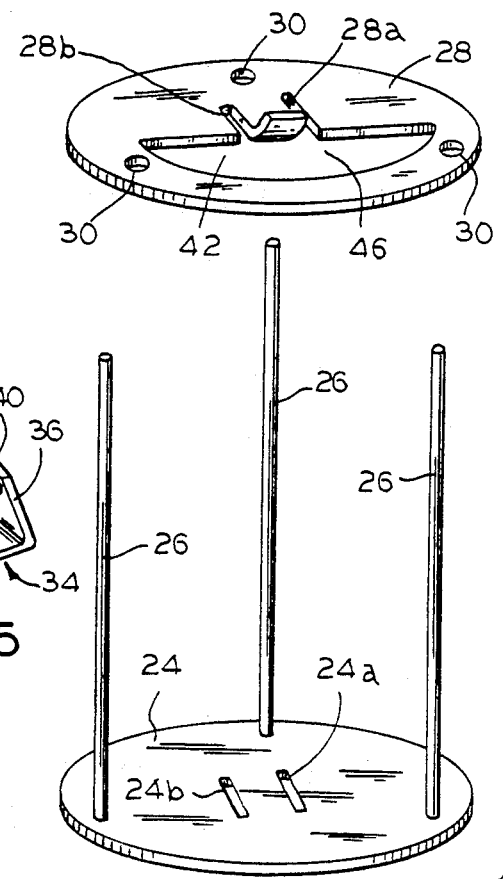
FIG.4

METHOD FOR FORMING A TIRE CLAD CONCRETE LOG

This is a division of application Ser. No. 379,067, filed July 13, 1989.

FIELD OF THE INVENTION

The present invention is generally directed to the utilization of waste materials for the purpose of environmental enhancement and, more particularly, to a tire clad concrete log and method and apparatus for forming a tire clad concrete log.

BACKGROUND OF THE INVENTION

In recent years, there has been an increasing awareness of the severe problem of properly disposing of waste materials Thus, there has been attention focused on the search for a solution to what remains an environmental problem of enormous proportions which is evidenced by resort to landfills, incineration and dumping in the ocean. Clearly, waste materials blight our environment, create expensive methods of removal and pose a threat to the health and welfare of mankind In this connection, there are special problems associated with many waste materials that still have not been adequately addressed For instance, proper disposal of used tires is a major problem in waste disposal since burning them creates atmospheric problems, burial is extremely costly, and dumping of used tires in the ocean is certainly less than satisfactory. In the latter instance, the used tires soon wash up on beaches due to wave action coupled with the relative weight of used tires.

In other respects, disposal of paper products is often achieved by incineration. However, while this reduces the problem of the enormous volume of paper products that constitutes waste materials in our environment, the ash created as a by-product of the incineration process is likewise a burden in its normal state. For this reason, proper disposal of waste ash remains a critical problem.

With regard to waste ash, it has been proposed to use it in concrete but with less than satisfactory results. There have also been other similar uses proposed and attempted but to no truly successful end. In this connection, the waste ash cannot be counted upon for the consistency required in design concrete applications.

In a seemingly unrelated problem, beaches and reefs are being eroded and washed away due to wave action. The various efforts to stop or reduce this problem have met with very little success as evidenced by frequent focus of attention by the media. As a result, it has remained to provide a satisfactory solution to beach and reef erosion.

The present invention is directed to overcoming the above stated problems and accomplishing the resulting objects.

SUMMARY OF THE INVENTION

It is a principal object of the present invention to provide a method of forming a tire clad concrete log for the purpose of environmental enhancement It is a further object of the invention to provide a tire clad concrete log wherein the concrete material is formed at least in part by waste ash. It is likewise an object of the present invention to provide an apparatus for forming a tire clad concrete log.

In a preferred form of the invention, the method includes the step of providing a plurality of used tires and thereafter making a form by placing the used tires in sidewall-to-sidewall contact. It also includes the step of providing a quantity of a waste ash and thereafter mixing the waste ash to form a binder in a manner making a concrete material after which the form is filled with the concrete material while still maintaining the used tires in sidewall-to-sidewall contact. Still further, the method includes the step of thereafter allowing the concrete material in the form made of the used tires to cure to form the tire clad concrete log.

Preferably, the form making step includes placing the used tires in a generally vertical coaxial stack and then slightly compressing the used tires prior to the concrete filling step. The form advantageously includes an open central core region defined by concentric beads of each of the used tires and adjacent peripheral regions defined primarily by interior portions of each of the used tires. With this arrangement, the form filling step preferably includes filling the core region and the peripheral regions with the concrete material for interlocking the concrete material and the used tires.

In another respect, the present invention is directed to a tire clad concrete log which is provided for environmental enhancement purposes. The log includes a plurality of used tires disposed in sidewall-to-sidewall contact and a concrete material formed at least in part by waste ash wherein the concrete material is interlockingly disposed within the used tires. Advantageously, the used tires are disposed in slightly compressed generally coaxial relation and they stay this way by reason of the concrete.

In still another respect, the present invention is directed to an apparatus for forming a tire clad concrete log. The apparatus includes a base plate having upstanding guide means integral therewith. The guide means is adapted to receive and support a plurality of used tires in vertical sidewall-to-sidewall contact. The apparatus also includes a cover plate adapted to engage an uppermost one of the used tires. Still further, the apparatus includes means for slightly compressing the used tires between the base plate and the cover plate to make a form from the used tires.

With this arrangement, the apparatus also includes means associated with the cover plate for filling the used tires with a concrete material formed of a Waste ash used as a binder. When the concrete material has cured, the base plates, guide means and cover plate are removable from the used tires inasmuch as the apparatus has formed a tire clad concrete log.

Preferably, the guide means includes a plurality of vertical guide rods integral with and disposed about the periphery of the base plate. The cover plate then advantageously has a plurality of holes about the periphery thereof which are sized and positioned to receive the guide rods. In this manner, the vertical stack of used tires can be confined within and between the base plate, guide rods and cover plate of the apparatus.

Preferably, the tire compressing means includes means interconnecting the base plate and the cover plate when the used tires are slightly compressed. More specifically, the interconnecting means preferably includes a tie rod formed from a reinforcing rod adapted to remain in the tire clad concrete log after the concrete has cured. It also includes a pair of plate holders formed of a section of used tire and a pair of slots in each of the base plate and cover plate. The pairs of slots are each adapted to receive one of the plate holders with sidewalls of the sections of used tires extending inwardly of the plurality of used tires. With this arrangement, the reinforcing rod may have a hook on each of opposite ends thereof adapted to be inserted through holes in the sidewalls of the sections of used tires.

Other objects, advantages and features of the present invention will become apparent from a consideration of the following specification taken in conjunction with the accompanying drawings.

BRIEF DESCRIPTION OF THE DRAWINGS

FIG. 1 is a perspective view of a tire clad concrete log in accordance with the present invention;

FIG. 2 is a cross sectional view taken on the line 2—2 of FIG. 1;

FIG. 3 is a cross sectional view of an apparatus for forming a tire clad concrete log in accordance with the present invention;

FIG. 4 is an exploded perspective view of a base plate, guide rods and cover plates of the apparatus of FIG. 3; and FIG. 5 is a perspective view of a plate holder formed of a used tire section.

DETAILED DESCRIPTION OF THE PREFERRED EMBODIMENT

Referring to the drawings, and first to FIGS. 1 and 2, the reference numeral 10 designates generally a tire clad concrete log in accordance with the present invention The log 10 includes a plurality of used tires 12 disposed in sidewall-to-sidewall contact together with a concrete material 14 formed at least in part by waste ash. As shown in FIG. 2, the concrete material 14 is interlockingly disposed within the used tires 12 which renders the tire clad concrete log 10 entirely integral after it is formed.

As will be appreciated, the used tires 12 are disposed in slightly compressed generally coaxial relation (see also FIG. 3). They form an open central core region 16 defined by concentric beads 18 and also form adjacent peripheral regions 20 defined by the interior portions or inner cavities thereof Referring to FIG. 2, the core regions 16 and the peripheral regions 20 are filled with the concrete material which is formed of a binder mixed with the waste ash.

Referring specifically to FIGS. 3 through 5, an apparatus 22 for forming a tire clad concrete log 10 is illustrated in detail.

The apparatus 22 includes a base plate 24 having upstanding guide means in the form of a plurality of vertical guide rods 26 adapted to receive and support a plurality of used tires 12 in vertical sidewall-to-sidewall contact. The apparatus 22 also includes a cover plate 28 adapted to engage an uppermost one of the used tires 12 as illustrated in FIG. 3. With this basic arrangement, the apparatus 22 still further includes means for slightly compressing the used tires 12 between the base plate 24 and the cover plate 28 to make a form from the used tires 12 as will be described hereinafter.

Referring to FIGS. 3 and 4, the guide rods 26 are integral with and extend vertically from the base plate 24. It will also be seen that the guide rods 26 are disposed about the periphery of the base plate 24, and the cover plate 28 has a plurality of holes 30 about the periphery thereof. With this arrangement, the holes 30 are each sized and positioned so as to receive one of the guide rods 26.

As for the tire compressing means of the present invention, it suitably includes means interconnecting the base plate 24 and the cover plate 28 when the used tires 12 are slightly compressed The interconnecting means may, for example, comprise a tie rod 32 formed from a reinforcing rod adapted to remain in the tire clad concrete log 10 after the concrete has cured Additionally, the interconnecting means includes a pair of plate holders 34 each formed of a section of used tire and a pair of slots 24a, 24b and 28a, 28b in each of the base plates 24 and cover plate 28.

As will be appreciated by comparing all of FIGS. 3 through 5, the pairs of slots 24a, 24b and 28a, 28b are each adapted to receive one of the plate holders 34 with sidewalls 36 of the sections of used tires extending inwardly of the plurality of used tires 12. It will also be seen that the tie rod or reinforcing rod 32 is such that it has a hook 38 on each of opposite ends thereof which is adapted to be inserted through holes 40 in the sidewalls 36 of the sections of used tires forming the plate holders 34. As a result, the tie rod or reinforcing rod 32 in conjunction with the plate holders 34 can hold the cover plate 28 relative to the base plate 24 so as to maintain the used tires 12 in a slightly compressed condition Still referring to FIGS. 3 through 5, the concrete material filling means includes a fill hole 42 in the cover plate 28. Thus, after the plurality of used tires 12 have been stacked as illustrated in FIG. 3 and the cover plate has been used to slightly compress the used tires 12 while interconnecting the plate holders 34 by means of the tie rod or reinforcing rod 32, the concrete material can be prepared, i.e., the waste ash binder can be mixed, after which it can be poured through the fill hole 42 until the central core 16 and the adjacent peripheral regions 20 defined by the used tires 12 is entirely filled. Once this has occurred, the apparatus 22 can be retained as illustrated in FIG. 3 until the concrete material has fully cured.

As should now be appreciated, the present invention is also directed to a method of forming a tire clad concrete log 10 for the purpose of environmental enhancement. The method includes the steps of providing a plurality of used tires 12 and thereafter making a form by placing the used tires 12 in sidewall-to-sidewall contact. It also includes the steps of providing a quantity of a waste ash and thereafter mixing the waste ash in a manner making a concrete material 14. The method further includes the steps of filling the form defined by the used tires 12 with the concrete material 14 while also maintaining the used tires 12 in sidewall-to-sidewall contact. Additionally, the method includes the step of thereafter allowing the concrete material 14 in the form made of the used tires 12 to cure to form the tire clad concrete log 10.

Preferably, the form making step includes placing the used tires 12 in a generally vertical coaxial stack (see FIG. 3). The form making step also includes slightly compressing the used tires 12 prior to the concrete filling step. In addition, the form filling step includes filling the core region 16 and the peripheral regions 20 with the concrete material 14.

As will be appreciated, the core region 16 is in communication with the peripheral regions 20 for interlocking the concrete material 14 and the used tires 12. Thus, since the interior of the form defined by the vertical co-axial stack of used tires 12 is essentially entirely filled, the resulting tire clad concrete log 10 comprises a unified, unitary assembly. After curing of the concrete material, the tread portions 44 of the plate holders 34 are cut to allow removal of the cover plate 28.

More specifically, the cover plate 28 may be then removed by sliding it off of the guide rods 26 after which the tire clad concrete log 10 may be removed from the remainder of the apparatus 10 comprising the base plate 24 and guide rods 26.

Referring to FIG. 3, it will be seen that one of the plate holders 34 is placed through the two slots 24a, 24b in the base plate 24 with the tread portion 44 below the base plate 24 and the sidewalls 36 protruding through the base plate 24. One of the hooks 38 on one end of the tie rod or reinforcing rod 32 is placed through what can advantageously be pre-punched holes 40 in each of the sidewalls 36 of the plate holder 34 associated with the base plate 24 and then temporarily maintained in a generally vertical orientation as similar sized used tires 12 are placed over the tie rod within the constraints of the guide rods 26 to form the vertical coaxial stack resting on the base plate 24 confined between the guide rods 26. As will be appreciated by referring to FIG. 3, the top one of the used tires 12 is above the hook 38 at the uppermost end of the tie rod or reinforcing rod 32 particularly before applying a compressing force to the stack of used tires 12.

At this point, the holes 30 in the cover plate 28 are aligned with the guide rods 26 to guide the cover plate 28 downwardly into contact with the top one of the used tires 12 after which pressure is applied to compress the entire stack of used tires 12 When this has been done, the hook 38 at the uppermost end of the tie rod or reinforcing rod 32 is placed through pre-punched holes 40 in the other of the plate holders 34 after which that plate holder 34 is placed in the slots 28a, 28b in the cover plate 28 over the retaining lip 46 which holds it in place. When this has been done, the pressure compressing the stack of used tires 12 can be released allowing it to spring back against the base plate 24 and cover plate 28 while being held by the tie rod 32 a fixed distance with the used tires 12 in a slightly compressed condition.

As for the tire clad concrete log 10, it will be generally cylindrical shaped as shown in the drawings (particularly FIG. 1). It is well suited for placement on the ocean floor to break wave action and allow marine life to grow and, thus, is excellent reef building material. In addition, the tire clad concrete log 10 can be used for many other applications such as guard rails for highways or embankments.

As will now be appreciated, the present invention has overcome a myriad of environmental problems in a most successful manner. It has taken commonly regarded problem waste materials such as used tires and waste ash and has turned them into a useful product that actually enhances the environment rather than destroying it. Even in the ocean, the used tires and concrete material pose no environmental hazard since they are not adversely affected therein.

While in the foregoing there has been set forth a preferred embodiment of the invention, it will be appreciated that the details herein given are merely for purposes of illustration, and the invention is only to be limited by the true spirit and scope of the appended claims.

I claim:

1. A method of forming a tire clad concrete log for the purpose of environmental enhancement, comprising the steps of:
    providing a plurality of used tires and thereafter making a form by placing said used tires in sidewall-to-sidewall contact and slightly compressing said used tires in generally coaxial relation;
    providing a quantity of a waste ash and thereafter mixing said waste ash with a binder forming a concrete material;
    filling said form with said concrete material while also maintaining said used tires slightly compressed and in sidewall-to-sidewall contact; and
    thereafter allowing said concrete material in said form made of said used tires to cure to form said tire clad concrete log.

2. The method as defined in claim 1 wherein said form making step includes placing said used tires in a generally vertical coaxial stack.

3. The method as defined in claim 1 wherein said form includes an open central core region defined by concentric beads of each of said used tires 4. The method as defined in claim 3 wherein said form also includes adjacent peripheral regions defined by interior portions of each of said used tires.

5. The method as defined in claim 4 wherein said form filling step includes filling said core region and said peripheral regions with said concrete material.

6. The method as defined in claim 5 wherein said core region is in communication with said peripheral regions for interlocking said concrete material and said used tires.

7. The method as defined in claim 6 wherein said form making step includes placing said used tires in a generally vertical coaxial stack.

* * * * *